(12) United States Patent
Rogers et al.

(10) Patent No.: US 9,449,412 B1
(45) Date of Patent: Sep. 20, 2016

(54) ADAPTIVE, CALIBRATED SIMULATION OF COSMETIC PRODUCTS ON CONSUMER DEVICES

(71) Applicant: Image Metrics Limited, Manchester (GB)

(72) Inventors: Michael Rogers, Manchester (GB); Tomos G. Williams, Wales (GB); Kevin Walker, Sheffield (GB)

(73) Assignee: Image Metrics Limited, Manchester (GB)

( * ) Notice: Subject to any disclaimer, the term of this patent is extended or adjusted under 35 U.S.C. 154(b) by 0 days.

(21) Appl. No.: 14/470,180

(22) Filed: Aug. 27, 2014

Related U.S. Application Data

(63) Continuation-in-part of application No. 14/019,748, filed on Sep. 6, 2013, now Pat. No. 9,104,908, and a continuation-in-part of application No. 13/795,882, filed on Mar. 12, 2013, now Pat. No. 9,111,134.

(60) Provisional application No. 61/874,506, filed on Sep. 6, 2013, provisional application No. 61/650,262, filed on May 22, 2012.

(51) Int. Cl.
| | |
|---|---|
| *G06T 11/00* | (2006.01) |
| *G06T 11/60* | (2006.01) |
| *G06Q 30/06* | (2012.01) |
| *G06Q 50/00* | (2012.01) |
| *A45D 44/00* | (2006.01) |

(52) U.S. Cl.
CPC ............ *G06T 11/60* (2013.01); *A45D 44/005* (2013.01); *G06Q 30/0623* (2013.01); *G06Q 50/00* (2013.01)

(58) Field of Classification Search
None
See application file for complete search history.

(56) References Cited

U.S. PATENT DOCUMENTS

| | | | |
|---|---|---|---|
| 5,659,625 A | 8/1997 | Marquardt | 382/118 |
| 5,854,850 A | 12/1998 | Linford et al. | 382/128 |
| 5,933,527 A | 8/1999 | Ishikawa | 382/190 |
| 6,091,836 A | 7/2000 | Takano et al. | 382/118 |
| 6,396,599 B1 | 5/2002 | Patton et al. | 359/1.9 |
| 6,502,583 B1 | 1/2003 | Utsugi | 132/200 |
| 6,719,565 B1 | 4/2004 | Saita et al. | 434/94 |
| 7,099,510 B2 | 8/2006 | Jones et al. | 382/225 |
| 7,619,638 B2 | 11/2009 | Walker, Jr. et al. | 345/269 |
| 7,634,103 B2 | 12/2009 | Rubinstenn et al. | 382/100 |

(Continued)

OTHER PUBLICATIONS

Cham et al., "A Multiple Hypothesis Approach to Figure Tracking," *Compaq Computer Corporation*, Cambridge Research Laboratory, Technical Report Series, CRL 98/8, 16 pages (Jul. 1998).
Chen et al., "Mode-based Multi-Hypothesis Head Tracking Using Parametric Contours," *In Proc. Autom. Face Gesture Recognition*, 6 pages (May 2002).
Cootes et al., "Active Appearance Models," *Proc. European Conference on Computer Vision*, vol. 2, pp. 484-498 (Jun. 1998).

(Continued)

*Primary Examiner* — Jon Chang
(74) *Attorney, Agent, or Firm* — Sunstein Kann Murphy & Timbers LLP

(57) ABSTRACT

Computer-implemented methods for real-time simulation of the application of one or more cosmetic products to a portion of the body of a user being imaged in an image-capture environment that is subject to uncertain lighting conditions. A real-time image of a portion of the user is captured and used to derive both image-capture environment parameters and user visual characteristics. Based on a desired look received from the user, a correspondence is extracted between the desired look and the pertinent portion of the user so that the desired look can be adapted to the image-capture environment parameters and the user's visual characteristics, and the adapted look is applied to an image of the user.

21 Claims, 4 Drawing Sheets

(56) References Cited

U.S. PATENT DOCUMENTS

| | | | |
|---|---|---|---|
| 7,916,904 B2 | 3/2011 | Suzuki et al. | 382/118 |
| 8,064,648 B2 | 11/2011 | Takano et al. | 382/117 |
| 8,082,926 B2 | 12/2011 | Yano et al. | 132/200 |
| 8,107,672 B2 | 1/2012 | Goto | 382/100 |
| 8,498,456 B2 | 7/2013 | Legagneur et al. | 382/118 |
| 9,058,765 B1* | 6/2015 | Mallick | G06F 3/0482 |
| 2003/0065589 A1* | 4/2003 | Giacchetti | A45D 44/005 705/26.1 |
| 2005/0135675 A1* | 6/2005 | Chen | G06T 11/00 382/162 |
| 2010/0189357 A1* | 7/2010 | Robin | G06T 11/001 382/195 |
| 2010/0271368 A1 | 10/2010 | McNamara et al. | 345/420 |
| 2011/0110561 A1 | 5/2011 | Havaldar | 382/103 |
| 2012/0044335 A1* | 2/2012 | Goto | A45D 44/005 348/77 |
| 2013/0215116 A1* | 8/2013 | Siddique | G06Q 30/0643 345/420 |
| 2013/0271484 A1* | 10/2013 | Aoki | A45D 44/005 345/593 |

OTHER PUBLICATIONS

Gao et al., "A Review of Active Appearance Models," *IEEE Trans. Syst. Man Cybern. C Appl. Rev.*, vol. 40, No. 2, pp. 145-158 (Mar. 2010).

Horn et al., "Determining Optical Flow," *Massachusetts Institute of Technology, Artificial Intelligence Laboratory*, A.I. Memo No. 572, 28 pages (Apr. 1980).

Liao et al., "Learning Multi-scale Block Local Binary Patterns for Face Recognition," *Center for Biometrics and Security Research & National Laboratory of Pattern Recognition, Institute of Automation, Chinese Academy of Sciences*, pp. 828-837 (2007).

Prabhu et al., "Automatic Facial Landmark Tracking in Video Sequences using Kalman Filter Assisted Active Shape Models," *ECCV '10 Proceedings of the 11th European Conference on Trends and Topics in Computer Vision—vol. Part I*, 14 pages (2010).

Viola et al., "Robust Real-time Object Detection," *2nd International Workshop on Statistical and Computational Theories of Vision—Modeling, Learning, Computing, and Sampling*, 25 pages (Jul. 2001).

* cited by examiner

ADAPTIVE, CALIBRATED SIMULATION OF COSMETIC PRODUCTS ON CONSUMER DEVICES

The present application claims the priority of U.S. Provisional Application Ser. No. 61/874,506, filed Sep. 6, 2013, and is a continuation-in-part of U.S. Ser. No. 14/019,748 and U.S. Ser. No. 13/795,882, thereby claiming the priority of U.S. Provisional Application Ser. No. 61/650,262, filed May 22, 2013. All of the aforementioned applications are incorporated herein by reference.

TECHNICAL FIELD

The present invention relates to a system and methods for automated synthesis of the appearance of makeup and cosmetic products, generally, in a video sequence in real time, and, more particularly, to synthesizing the appearance of such products in an unconstrained consumer environment where the synthesis occurs entirely on widely available consumer hardware.

BACKGROUND ART

Cosmetic products[1] are used to enhance or alter the appearance of a person's face or other body parts for the purposes of beautification. Altering the appearance of a face by applying makeup is a time-consuming task requiring the use of expensive cosmetic products, specialized applicators and expertise. The same applies to trialling other cosmetic products such as nail varnish. Consumers may wish to apply many different cosmetic products and view them in different combinations before selecting a desired look. They may also wish to view the look in a variety of facial expressions and poses to aid their evaluation, for example by changing their facial expression and pose and whilst viewing their face in a mirror, or moving their hands to view a nail polish in different lights. This immediate visual feedback is crucial in enabling the consumer to form opinions and make refinements to their makeup selection. The physical application of many different makeup looks is a time-consuming and costly process and, in addition, cosmetics need to be removed between applications, thereby further increasing effort and cost. Despite these negative factors, the value that physically trying on cosmetic products adds to a consumer's purchasing decision means that it remains an extremely popular method of purchasing these products.

[1] No distinction is made among the terms "makeup," "cosmetics," "makeup cosmetics," and "cosmetic products," all of which are used interchangeably herein.

While, for heuristic convenience, the present application may refer to makeup and its application to the face, it is to be understood that the teachings herein apply in equal measure to any cosmetic product applied to any body part. Similarly, references to 'makeup' subsume other cosmetic product such as nail varnish, skin tanning lotion, permanent makeup and tattoos.

Methods of synthesizing the appearance of a cosmetic on a subject's body have the potential to reduce the cost and time required to visualise different looks. This potential can only be realised if the synthesized appearance gives a true and realistic representation of the physical product when applied to the body of the subject and is achievable in a natural, accessible and immediate way. The potential of any makeup simulation system is reduced if the consumer faces technical or usability barriers, such as a lengthy and difficult setup process or a complex interface.

An ideal system of makeup simulation must have no difficult or time-consuming setup, must simulate accurate and realistic makeup appearance, and should be deployed on widely available and convenient consumer hardware. Moreover, it should also allow the subject to view the synthesized appearance in a variety of poses and expressions naturally, in real-time and with little effort. To maximize the accessibility of such a system to consumers, the system must also be capable of performing in an arbitrary consumer environment, such as in the home or outdoors, and must therefore be able to operate with very few constraints on lighting conditions, image resolution or the subject's position in the image. This scenario is referred to herein as an "unconstrained consumer capture environment."

Methods heretofore developed for synthesizing makeup looks have often been limited to single image systems. The dependence on a single static image severely limits the subject's ability to visualize the appearance of the physical makeup in a natural way by removing their ability to experiment with expression and pose. For example, U.S. Pat. No. 6,937,755 to Orpaz et al., entitled "*Make-up and fashion accessory display and marketing system and method*", describes a system which is based on a single template image. Furthermore, the system is at best semi-automatic and requires a lengthy preparation for each template image before the subject can achieve a simulated result. A further example of this type of system is described in U.S. Pat. No. 8,265,351 to Aarabi, entitled "*Method, system and computer program product for automatic and semi-automatic modification of digital images of faces*". Aarabi also describes a single-image-based approach and teaches another semi-automatic method based on detecting regions of interest on the image of the subject's face. Aarabi also teaches that user feedback is required to fine-tune the features and the resulting synthesised images, which again is a complex and time consuming task for a consumer to perform. Any methods that require even a small amount of user refinement per image are not appropriate for a real time video based simulation.

In addition to the prior-art references listed above, there are several systems provided on the Internet that allow the modification of single images of a subject using manual or semi-automatic analysis, for example EZface™, MODIFACE™ and others. These have been fairly widely deployed but have had limited impact on consumer behaviour due to their relatively complex setup and usage requirements. As previously stated, these systems are fundamentally limited to a single image of the subject, and so fail to provide a natural equivalent to the physical process of trying on makeup products such as viewing applied makeup in a mirror. The systems are also somewhat limited in the images that they are able to process, requiring good lighting and high-resolution images as input which is a further barrier to wide-scale adoption in the consumer space.

More recently real-time video modification systems have become available, for example Google+ Hangouts, Logitech Video Effects and others. These systems apply overlays and effects to video streams in real-time, however none of them are aimed at, or achieve, a simulated makeup effect at the level of realism and accuracy required for a virtual try-on application. The method and apparatus described in U.S. Pat. No. 8,107,672, to Goto, entitled "*Makeup simulation system, makeup simulator, makeup simulation method, and makeup simulation program,*" teaches a system for real-time simulation of makeup on a video sequence of a subject's face. This system is intended for deployment in a controlled capture environment such as a makeup counter in a shop, and is implemented on custom hardware. The system is based on the automatic recognition of a set of pre-defined facial features, however the description fails to teach the method by which this is achieved. In an unconstrained consumer capture environment, lighting, head pose, occlusion and other factors mean that a pre-determined set of features will not be visible on each frame of video in general, which severely restricts the system's utility outside of a controlled environment. In common with other prior-art, the system also fails to teach methods of realistic simulation of makeup in unconstrained lighting conditions, which is required when deploying a system in an unconstrained consumer capture scenario. As the system requires specific hardware, consumers would be required to travel to key locations in order to use the system, this is a major disadvantage. A system that utilised standard consumer hardware would mean consumers can try on makeup, at their convenience, wherever they are located.

In view of the foregoing, methods are needed that simulate realistic makeup appearance in a manner free of environmental constraints.

SUMMARY OF EMBODIMENTS OF THE INVENTION

In the present invention, systems and methods are provided for real-time simulation of the application of cosmetic products to a portion of a user's body, such as the face or hand, in an unconstrained image-capture environment and on a commercially available consumer device. One such method has a first step of capturing a real-time image of the users body in an unconstrained image-capture environment. From the real-time image, image-capture environment parameters, user visual characteristics and a correspondence between cosmetic product and the user's body are derived. A composite image of the portion of the users body with the desired cosmetic products applied based on the correspondence is produced. The extracted image-capture environment parameters and user visual characteristics are used to ensure that the virtual cosmetics appearance in the composite image matches the image-capture environment and user's skin tone.

A desired makeup look may include one or more cosmetics that the user wishes apply to a portion of their body. A makeup look also describes details of how each product should be applied such as coverage. Makeup looks can be modified by either changing which products are included in the look or modifying the product properties, for example, changing colors, area of coverage or reflectance properties. Makeup looks can be specified as at least one makeup template.

In one embodiment of the invention, the product properties may be obtained from measurements of a physical embodiment of the product, while, in an alternative embodiment, the product properties may be created by the user.

Cosmetics within a makeup look are described in a compact form allowing entire catalogs of the products to be communicated to a consumer device via a computer network, a wireless network or an image scanner.

In an embodiment of the invention the correspondence is defined by extracting a plurality of locations corresponding to an adaptive set of feature locations. In a alternative embodiment a plurality of expression measurements may be used.

Makeup looks can include a plurality of independent layers corresponding to physical application of makeup. Each layer can have its color modified allowing different colors to be simulated using a single makeup template A device color profile may be predetermined and used to modify a template's color such that an accurate representation of the color is displayed on the device. In another embodiment of the present invention, before- and after-images are displayed simultaneously illustrating the user's appearance with and without virtual makeup.

In a further embodiment of the present invention, the subject may modify the product parameters within the makeup template to design new makeup products. This may be advantageously applied in both laboratory and consumer environments and allows virtual products to be evaluated on any subject and under any environmental conditions without the expense of creating the physical product. In another embodiment of the invention, the product parameters can refer to physical ingredients.

BRIEF DESCRIPTION OF THE FIGURES

The foregoing features of the invention will be more readily understood by reference to the following detailed description, taken with reference to the accompanying figures, in which.

DETAILED DESCRIPTION OF EMBODIMENTS OF THE INVENTION

Definitions

Figure 1:
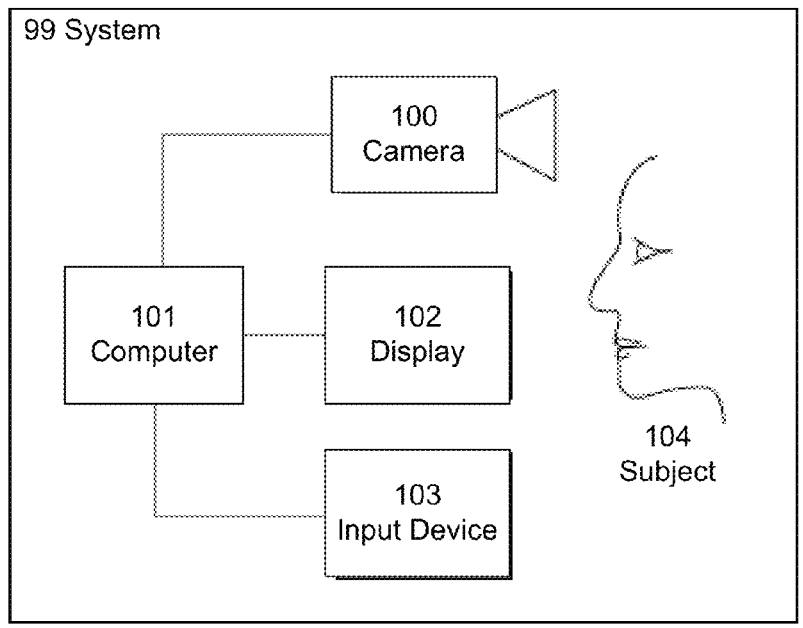
FIG. 1 schematically depicts the basic components of the adaptive, calibrated makeup simulation device in accordance with embodiments of the present invention.

As used herein and in any appended claims, and unless the context requires otherwise, the term "cosmetic product" (or, synonymously, "makeup" or "makeup cosmetic") shall refer to any substance used to modify or enhance the appearance of a person both permanently or temporarily, as well as to any digital simulacrum thereof used to modify or enhance the appearance of an image of a person. The substantive cosmetic product may be referred to as "physical," whereas the digital simulacrum may be referred to as "virtual."

As used herein and in any appended claims, the term "personal computational device" (PCD) shall designate any electronic product that is normally owned and operated by one person, and that can be easily transported from place to place, and that contains a video display, a central processing unit (CPU, typically a microprocessor), an operating system, and local memory, and that may be coupled to a network such as, typically, the internet, wirelessly or via cable. A PCD might also optionally contain a dedicated graphics processor (GPU, typically a microprocessor). Examples, provided without limitation, include a mobile phone, tablet computer, smart TV, smart TV second screen and a personal computer.

As used in this description and in the appended claims, the term "image" refers to any multidimensional representation, whether in tangible or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as temperature, in one or more colors constitutes an image. So, also, does an array of numbers in a computer memory or holographic medium. Similarly, "imaging" refers to the rendering of a stated physical characteristic in terms of one or more images.

Capturing an image shall refer to encoding a two- or three-dimensional appearance of a physical object, including a person, in a multidimensional representation, namely, an image.

Image-capture environment shall refer to the physical environment where a physical object, including a person, is located at the time that an image is being rendered of that object or person.

The term "arbitrary," as used herein, shall mean "any," within ordinary constraints of the range of values of a feature to which the adjective "arbitrary" is applied.

The term "lighting conditions" shall encompass the spectrum, intensity and direction of each source of illumination.

The term "real-time" as applied to a video sequence means that the result of a computation, such as a simulation of a makeup look, etc., is instantiated on the images of a face at the same time as the user is being imaged.

An "adaptive set of feature locations" is discussed in U.S. patent application Ser. No. 14/019,748, which is incorporated herein by reference. More particularly, an "adaptive set" refers to a set of elements (inclusive of values or parameters), the elements of which may be varied in time without the set losing its characterization as the originally identified set. When elements of the adaptive set of features have been modified, the adaptive set of features may be referred to as an "adapted set of features," or, equivalently, as an "adapted feature set."

Throughout this document the term "face" may be referred to as a proxy for any portion of the body of a subject that has a virtual cosmetic product applied. It is to be understood that the use of the term "face" does not limit the scope of the invention to this specific-use-case. The reader should assume that unless otherwise stated, where the subject's face is mentioned other body parts can be used interchangeably and where makeup is used other cosmetic products can also be used interchangeably.

The term "Makeup Template" (whether capitalized, or not) shall refer to a generic representation of a cosmetic product covering a specific portion of a human body, in any medium whatsoever, that may serve as the basis for application of cosmetic features resulting in the generation of a desired "look." Examples of Makeup Templates include, but are not limited to, lipstick, lip liner, eyeshadow, eyeliner, cheek blush, mascara, nail varnish, skin tanning lotion, permanent makeup and tattoos.

DESCRIPTION OF EMBODIMENTS

A system 99 that may be employed for practice of embodiments of the present invention is first described with reference to FIG. 1. A monocular video camera 100 is positioned to capture the face of a subject 104 during a facial performance, and a computational device 101 contains a central processing unit and memory. The memory is capable of storing all of the entities (such as the Makeup Templates 202 and Adaptive Expression Extractor 207) and data of the system (such as the Expression Measurements 300).

In particular, image-capture environment parameters and user visual characteristics may be derived from the real-time image of the face of the user. Examples of image-capture environment parameters include lighting spectrum and lighting direction and intensity. Examples of user visual characteristics include skin tone and skin texture.

The memory also contains a program in the form of a series of instructions which, when executed by the central processing unit, and applied to the data and entities, simulates makeup on the images captured by the camera. The system 99 is configured so that the video of the subject is captured by camera 100 and streamed to computational device 101 for processing and generation of the simulated look image 212 in real-time. In one embodiment of the invention, the computational device displays the simulated look image stream on a physical display 102 for the Subject 104 to view. In another embodiment of the invention, the simulated look images are stored within the computational unit's memory for off-line analysis, by computational device or by another system. In another embodiment of the invention, the simulated look images are streamed to another device over a network for viewing by a third-party subject. In another embodiment of the invention, the Input Device 103 is used by the subject to set parameters which modify the output of the makeup simulation, for example color and style parameters as described below. Input device maybe a touch screen, keyboard, pointing device. Any other input device capable of capturing this information falls within the scope of the present invention.

Real-Time Makeup Simulation Process

One embodiment of the invention provides for the production of a continuous stream of images which simulate a specific makeup look giving the impression of a realistic physical application of makeup on to the subject's face. The production of this stream is separated into two phases; a Calibration Phase 200 and a Simulation Phase 201. The Calibration Phase receives an input from the subject, who may also be referred to herein as a "user," insofar as it is typically the person whose face is being imaged who is the operator of the system described herein, although it is to be understood that such is not necessarily the case within the scope of the present invention. The makeup look that is indicated by the user may be referred to herein as the "desired makeup look." The Calibration Phase creates the desired makeup look in such a way that it is tailored to the subject's skin tone and the image capture environment, in which case the look may now be referred to as the "calibrated makeup look". The Simulation Phase uses the calibrated makeup look to produce Simulated Look Images where the makeup look is mapped accurately onto the subjects face and lighting is convincingly matched to create the desired realistic output image stream. The Simulation Phase is able to produce Simulated Look Images at typical video frame rates directly on consumer mobile hardware.

Figure 2:
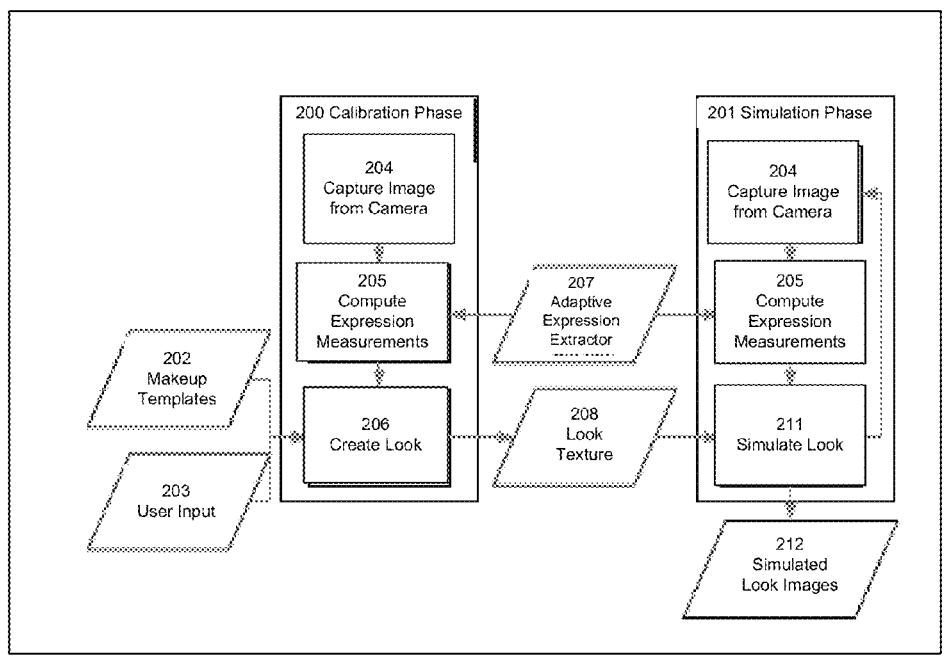
FIG. 2 is a flowchart showing the two phases of makeup simulation, in accordance with embodiments of the present invention.

Methods for generating Simulated Look Images from images of a subject captured by camera are now described with reference to the flowchart depicted in FIG. 2. The following is an overview of the system and each component will be described in detail below. The Calibration Phase uses the Create Look module 206 to create a Look Texture 208 from a set of Makeup Templates 202, User Input 203 and derived information about the subject's skin tone and various camera characteristics. Skin tone and camera parameters are derived with reference to Expression Measurements produced by an Adaptive Expression Extractor 207 and an Image Frame 400 obtained from the camera. The Expression Measurements 301 contain information on the subject's 3D pose and expression in the image which can be used to accurately identify regions of the image over which to calculate the skin tone and camera parameters. The resulting Look Texture combines one or more generic Makeup Templates and modifies the result to match the subject's skin tone and image capture environment. The Simulation Phase simulates a look on each image captured from the camera at the desired frame-rate, typically between 30-60 fps. The simulated look is based on the Look Texture and is constructed with reference to Expression Measurements. The Expression Measurements and the captured image are passed to the Simulate Look 211 module which maps the desired makeup look accurately and precisely onto the expression of the subject in the image and matches lighting conditions convincingly to give the impression of a realistic physical application of makeup on to the subject's face.

Expression Measurements

The invention is designed to operate in an unconstrained consumer capture environment. Achieving reliable expression measurements in such a scenario is a challenging task. Facial tracking and expression measurement approaches are available in the prior-art, for example, Active Appearance Models (AAMs) as taught in Cootes, et al., "*Active appearance models*", Proc. European Conf. on Computer Vision, vol. 2, pp. 484-98, (Springer, 1998), however the authors are not aware of a system capable of performing with the accuracy and precision required without some form of constraint on image capture such as controlled lighting, constrained head pose or constrained subject expression.

In order to attain the requisite robustness described above, embodiments of the present invention employ the extremely robust and adaptive expression measurement system described in U.S. patent application Ser. No. 14/109,748, to Rogers et al., entitled "*Building Systems for Adaptive Tracking of Facial Features across Individuals and Groups*", hereafter referred to as "Rogers et al.," which is incorporated herein by reference. The Compute Expression Measurements 205 module (shown in FIG. 2) implements this system, and expression measurements or other measures of body appearance that are produced contain information about the neutral 3D shape of a subject, their expression encoded as a set of activation values for each of a set of basic expressions which, when combined together, accurately and precisely reconstruct the subject's appearance on each frame. The measurements of expression, or analogous measurements relating to other portions of the body, also contain information on the position and orientation of the user in 3D space and a camera with parameters through which to perform a projective mapping between 3D space and image coordinates.

The expression measurements also enable the retrieval of a set of feature locations in the image frame corresponding to physical locations on the subject's body. These locations are adaptive and may differ from frame-to-frame.

In particular, the feature locations in successive frames or images may adapt to the specific appearance and image capture conditions of each frame of a video sequence. The feature adaptation system may be referred to herein as an "adaptive tracker." As described in detail in Rogers et al., adaptive tracking may be achieved by selecting an adaptive set of feature locations during calibration, and, during video tracking potentially refining that set further based on the characteristics of each frame.

Where a body part other than the face 104 is used, such as a hand, expression measurements enable the retrieval of a set of feature locations appropriate to that body part, such as finger tips or nail bed boundaries. A system such as that of Rogers et al. is trained to extract features and measurements appropriate to characterise a specific body part.

Create Look

Figure 3:
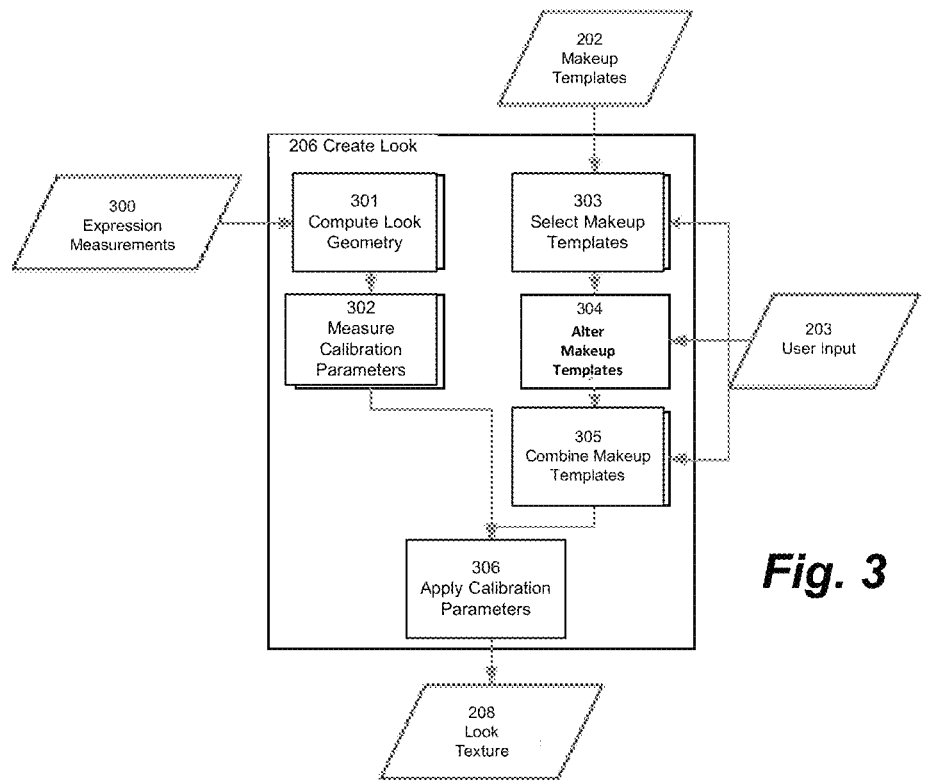
FIG. 3 shows a flowchart of the Create Look 206 process, in accordance with an embodiment of the present invention.

Methods for creating a Look Texture by combining multiple Makeup Templates are now described with reference to the flowchart depicted in FIG. 3.

The invention contains a number of Makeup Templates each of which represent a different type of makeup covering a specific area of the body, such as a face. In one embodiment of the invention, examples of Makeup Templates include, but are not limited to, lipstick, lip liner, eyeshadow, eyeliner, cheek blush, mascara, nail varnish, skin tanning lotion, permanent makeup and tattoos. The ingredients in a cosmetic product define its physical appearance in terms of color and surface reflectance properties such as 'matt' or 'glossy.'

Figure 5:
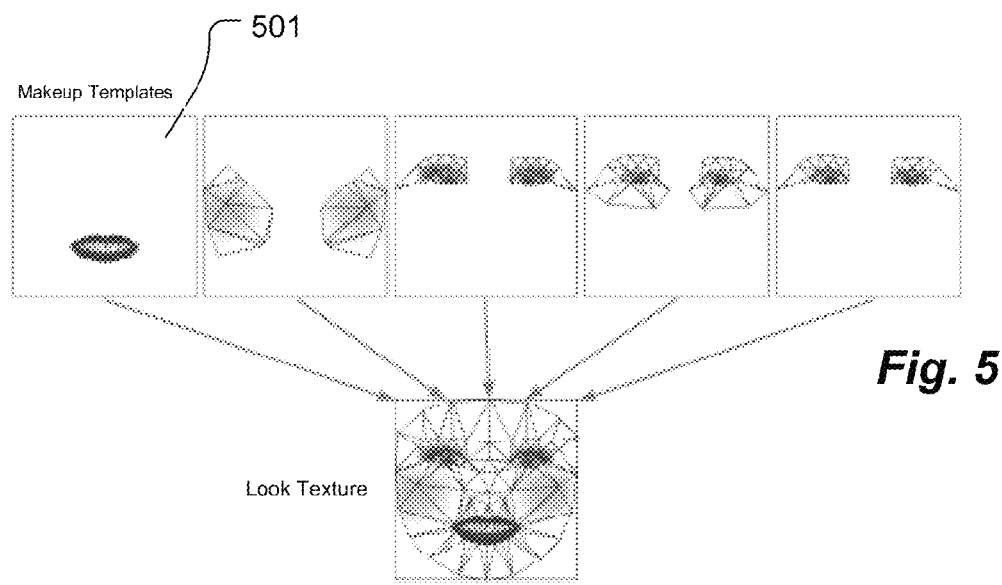
FIG. 5 shows examples of Makeup Templates being mapped to a facial reference image space, in accordance with an embodiment of the present invention.

In general, cosmetic products can contain multiple sets of ingredients each producing a distinct appearance, for example a base color combined with a set of highly reflective particles or "pearls" to provide a sparkle effect. In one embodiment of the present invention, a product is composed from multiple Makeup Templates, each describing a specific component of the product such as its base color, or the pearls that exist within the makeup to give it a sparkle. Many other effects may be achieved by combining templates to form a composite product. Each Makeup Template specifies the coverage of the makeup component with reference to a set of body part feature points. In one embodiment of the invention the coverage is specified as a four-channel image; 3 color intensity (Red, Green and Blue) and one transparency (Alpha) value for each pixel. In another embodiment of the invention, the Makeup Template is specified as a single base color and a two-channel image, where the channels represent intensity and transparency for each pixel. Any other suitable representation of such a template is included within the scope of the invention. FIG. 5 shows examples of such templates together with example feature points connected as a triangular mesh.

In another embodiment of the invention, the Makeup Template also includes a set of parameters which describe other properties of the physical makeup product. These may include, but are not limited to, the product's reflective properties such as the glossiness of the finish, or properties which define a sparkle such as size, density and color of small shiny particles within the product. These parameters may be based upon known ingredients or physical measurements of a makeup product using a spectrometer or a calibrated photograph. These parameters may also be specified by an operator to simulate makeup products yet to be physically produced.

Encapsulating the properties of makeup products in a minimal set of carefully chosen parameters provides a complete and compact representation of each product. This makes it possible for single products or entire ranges of products to be transmitted over mobile networks or to be represented with low-capacity methods, such as QR codes or other codings, and enables data describing a large number of products to be stored on devices where storage may be limited or at a premium.

Embodiments of the present invention may employ user-generated templates by giving the subject tools to create a Makeup Template 501 (shown in FIG. 5) by manipulating and adding to a template image with known Expression Measurements. This template maybe an image of the subject, an image of another subject, an abstracted image of a face or other body part, or even a real-time video stream of the subject.

Using the facial feature points, Makeup Templates may be mapped into a consistent image space, and from that space, onto the image of a subject as described below. This consistent image space may be referred to herein as a "facial reference space." FIG. 5 shows an example of multiple templates combined after mapping into the facial reference space.

To enable efficient storage and deployment on consumer devices, Makeup Templates may have their color transformed to represent multiple different physical products. To enable this, a base color value is stored with each template which is used as a reference value during the Color Shift Makeup Templates module, described below.

Makeup Templates may be defined with respect to a specific skin tone, but need to look realistic when applied to subjects of arbitrary skin tones and varying skin tones. To enable this, a reference skin tone color may be stored as part of each Makeup Template.

Compute Look Geometry

A critical component of the invention is the modification of the Makeup Templates to match the skin tone and image capture environment of the subject in the Input Image. This requires measurements to be taken from the subject's face or other body component in the image, and the simulated makeup to be rendered precisely into the image. The Compute Look Geometry 301 module is used to generate a mapping between Makeup Templates, Look Textures and the subject's face in the Input Image. This mapping is such that the makeup overlays the target facial features in the image frame precisely and accurately. This mapping is implemented using the facial reference space as a common space that both Makeup Templates and the Input Image can be transformed into.

In one embodiment of the invention, mappings are generated from the Input Image to the facial reference space with respect to 2D image coordinates. As described in Rogers et al., the Expression Measurements contain the 2D image coordinates of a set of adaptive facial features each of which is associated with a specific facial location. Although the set of features measured will typically vary from frame to frame, their facial locations are defined in the facial reference space. Using standard image warping techniques, such as piece-wise bilinear or thin-plate spline transforms, the Input Image can be mapped to the facial reference space. Precision and realism are critical components of the invention and, in general, the adaptive features are too sparse to define this mapping to the required level of detail. For this reason, we enhance the set of adaptive features using prior knowledge of facial structure before defining the mapping. In one example, extra features which refine the mapping of smooth facial boundaries, such as lip and jaw edges, can be added to the adaptive feature set by fitting spline curves to the members of the original sparse set belonging to these features. Another example is to use knowledge of the circularity of the iris and its occlusion by the eyelids to refine the mapping in the eye region by imposing these constraints. Other prior knowledge about the geometry of the face can be represented in this way and is included within the scope of the invention.

In another embodiment of the invention, the mappings are defined with reference to the Expression Measurements using a 3D geometric representation of the subject. The Expression Measurements contain information about the shape of the subject's head, its position and orientation in 3D space and measurements of the subject's expression in the Input Image. It is widely known in the prior-art how to produce a 3D geometry with shape variation parameters compatible with the Expression Measurements. When applying the Expression Measurements to the 3D geometry in the standard way, the vertices of the geometry project precisely onto the subject in the image providing a mapping between the Input Image and the facial reference space. In the prior-art terminology for 3D methods, the equivalent to the facial reference space is referred to as a UV space, for example as described in "UV mapping", en.wikipedia.org/wiki/UV_mapping, incorporated herein by reference, which associates a 2D image with 3D geometry. The Makeup Templates are mapped to the facial reference space in the same way as above. The 3D geometry can contain elements enabling the simulation of features not present in the Input Image, for example large false eyelashes or other facial adornments such as earrings.

Measure Calibration Parameters

The Measure Calibration Parameters module 302 measures various properties from the image such as lighting, camera parameters and the skin tone of the subject. These parameters are used to match the Look Texture to the subject's appearance in the image to ensure a realistic final Simulated Look Image. Measuring image parameters during calibration and using them to alter the Simulated Look greatly enhances the realism of the simulated makeup in the Simulated Look Images; a feature not incorporated in the other virtual makeup systems mentioned above.

Since the capture conditions are expected to remain relatively constant throughout a session, calibration is only required on certain frames, for example; the first frame; when a different subject appears before the camera; or when lighting conditions change significantly.

In an unconstrained consumer capture environment very little is known in advance about the camera parameters or lighting conditions. The Expression Measurements contain estimates of camera parameters such as focal length, position and orientation, from which projective transforms can be calculated, but image formation parameters such as white-balance are not available. White balance can exhibit large variation across consumer cameras and correctly accounting for white balance changes is crucial to obtaining a realistic simulation of a specific makeup look. The skin tone of the subject also has a significant effect on the appearance of a makeup product when physically applied and so must also be taken into account. These and other parameters cannot be measured directly in a consumer capture environment and so must be estimated using the Input Image and prior knowledge.

In one embodiment of this invention camera white balance is estimated using prior knowledge of skin tone groups. The observed skin-tone, $\overline{RGB}$, contaminated by the camera's white balance, is measured in the Input Image as the average value for each color channel in the subject's facial region. The closest uncontaminated skin tone distribution prior is selected as the target skin tone. The camera white balance $RGB^{wb}$ is calculated as the offset between $\overline{RGB}$ and the selected distribution's mean RGB value. This value is applied to correct the Look Texture to match the subject's camera as described below.

The effect of applying the Look Texture to the subject's skin tone is achieved in HSV (Hue, Saturation, Value) color space as a scaling of the saturation and value channels. The observed and target RGB values are converted into a HSV representation and saturation and value scaling parameters are calculated as the ratio between their per-channel mean values as follows:

$$s^s = S^i / S^t$$

$$v^s = V^i / V^t$$

where $S^i$, $S^t$ are the saturation channels from the image and the reference respectively, $V^i$, $V^t$ are the value channels from the image and the reference respectively, Both the saturation scale, $s^S$, and value scale, $v^S$, parameters are applied to match the Look Texture to the subject's skin tone as described below.

In order to simulate reflected light incident on the simulated makeup, the color of the light source illuminating the subject is estimated. For example, specular reflections are mirror-like reflections of light from a surface and therefore should have a similar coloring to the source light if a realistic look is desired. The color of the light source can be estimated by looking at the brightest pixels in the image that have not been over-exposed and by calculating the maximum value per channel. Other techniques giving rise to estimates of light source color are also within the scope of the present invention.

Select Makeup Templates

The subject is given control over the makeup simulation system by being allowed to set various parameters through Input Device. These parameters control the set of makeup templates that will be applied to the simulated look, allowing the subject to construct different makeup styles. In the Select Makeup Templates module 303, the User Input is used to select a subset of Makeup Templates combined to create the Look Texture.

In one embodiment of the present invention, the subject can modify the reflectance and color parameters within the Makeup Template to design new makeup products. This may be advantageously applied in both laboratory and consumer environments and allows virtual products to be evaluated on any subject and under any environmental conditions without the expense of creating the physical product.

Altering Makeup Templates

The Alter Makeup Templates module 304 alters the color of a Makeup Template defined using a single base color, thus eliminating the need for multiple templates to be defined for each color of a makeup the user may wish to apply. The Alter Makeup Templates module accepts a Makeup Template and a target color as inputs and generates a Makeup Template altered to the target color as output. The target color may or may not be provided as User Input. The target color could come from known ingredients properties or physical measurement from a makeup product using a spectrometer or a suitably calibrated photo. In one embodiment of the invention, a color shift is achieved in the HSV color space. Both the color template's base color and target color are converted to a HSV representation. Two parameters are used to alter the Makeup Template's color mask; the color shift is calculated as the base color minus the target color and the scaling parameter for the Saturation and Light channels as the base color divided by the target color.

$$H_{shift} = H_{base} - H_{target}$$

$$S_{scale} = \frac{S_{base}}{S_{target}}$$

$$V_{scale} = \frac{V_{base}}{V_{target}}$$

The Makeup Template's color mask is converted to a HSV representation, and the shift and scale applied to each pixel of the template. The validity of the resultant HSV representation is ensured by wrapping the Hue angle representation to the range 0o to 360o, and the Saturation and Value channels are truncated to range [0,1]. Finally, the color altered template is converted back to a RGB representation.

In one embodiment of the invention, the color profile associated with the devices camera, 100, and display, 102, are taken into account to alter the makeups color in order to create a more realistic effect. Device color profiles are described at en.wikipedia.org/wiki/ICC_profile, which is incorporated herein by reference. The colors within a scene can alter significantly when viewed using different cameras and/or visual display devices. Failure to deal with these differences can result in the applied products looking out of place in an image. Adapting the makeup color by applying a devices color profile greatly enhances the realism of the product within the end image.

Methods for measuring and applying device color profiles are available in prior art, for example www.color.org/creatingprofiles.xalter, which is incorporated herein by reference.

Combine Makeup Templates

The Combine Makeup Templates module 305 combines one or more Makeup Templates to produce a single Makeup Template in a unified image space. Each Makeup Template is registered onto a common image-space using standard warping techniques, and a layered approach is used to combine all of the registered makeup templates. The layering approach mimics the physical process of applying makeup which produces a realistic effect when applied to the input image.

In an alternative embodiment, the makeup templates are registered onto into a common space but not combined into a single makeup template. In this embodiment, all registered Makeup Templates are passed to the Apply Calibration Module 306, and, therefore, multiple Look Textures 208 are produced, each of which are rendered, in turn, in the Simulate Look 212 module.

Layered combination of the registered Makeup Templates is achieved using well known methods, for example as described in, "Alpha Compositing," en.wikipedia.org/wiki/Alpha_compositing, incorporated herein by reference.

The Makeup Templates are ordered in a way that corresponds to the order in which physical layers of makeup would be applied. This ordering can be configured based on user input. Each layer is combined one-by-one into a unified Look Texture. In one embodiment of the invention, alpha compositing is achieved by a per-pixel sum of the color channels, weighted by their relative alpha masks, for example using:

$$C_{o'} = \frac{(C_o \alpha_o) + (C_i \alpha_i)}{(\alpha_o + \alpha_i)},$$

and $$\alpha_{o'} = \alpha_o + \alpha_i(1-\alpha_o)$$

where:
$C_o$, $\alpha_o$ are the input Look Texture's pixel color and alpha value;
$C_i$, $\alpha_i$ are the Makeup Template's pixel color and alpha value; and
$C_{o'}$, $\alpha_{o'}$ are the output Look Texture's pixel color and alpha value.

Apply Calibration Parameters

The parameters from the Measure Calibration Parameters 306 module are applied to the Look Texture to match the makeup to the subject's skin tone and capture conditions. To take account of the subject's skin tone, each pixel in the Look Texture is modified in the HSV color space using the following equations:

$$S' = s^S S$$

$$V' = s^V V$$

where $s^S$ and $s^V$ are defined above and S and V are the saturation and value channels of the HSV representation respectively.

White balance adjustment of the Look Texture to match that of the subject's camera, is achieved by adding $RGB^{wb}$, computed during the calibration phase, to the Look Texture pixels.

Simulate Look

Figure 4:
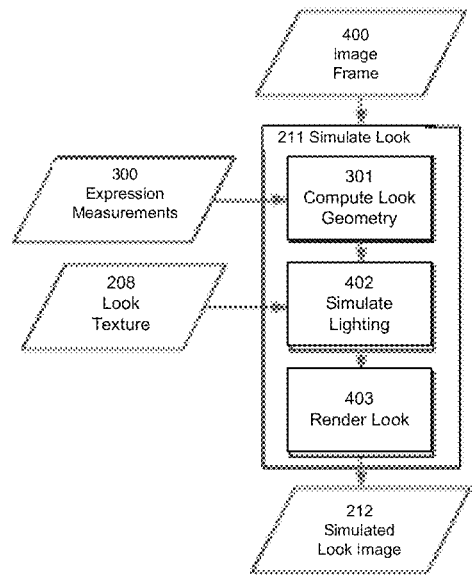
FIG. 4 shows a flowchart of the Simulate Look 211 process, in accordance with an embodiment of the present invention.

The Simulate Look method for generating a Simulated Look Image from an Image Frame, Expression Measurements and a Look Texture is now described with reference to the flowchart depicted in FIG. 4. The Simulate Look module uses the Compute Look Geometry module, described above, to calculate a mapping between the image and the look texture using either 2D or 3D techniques. This mapping is used by the Simulate Lighting module 402 to calculate the lighting component and apply them to the Look Texture to produce a realistic makeup simulation that matches the physical image capture conditions. Finally, the Simulated Look Image is produced by the Render Look module which combines the Look Texture with the Input Image using the image to makeup mapping. Each of these sub-methods are described in detail below.

Simulate Lighting

Figure 6:
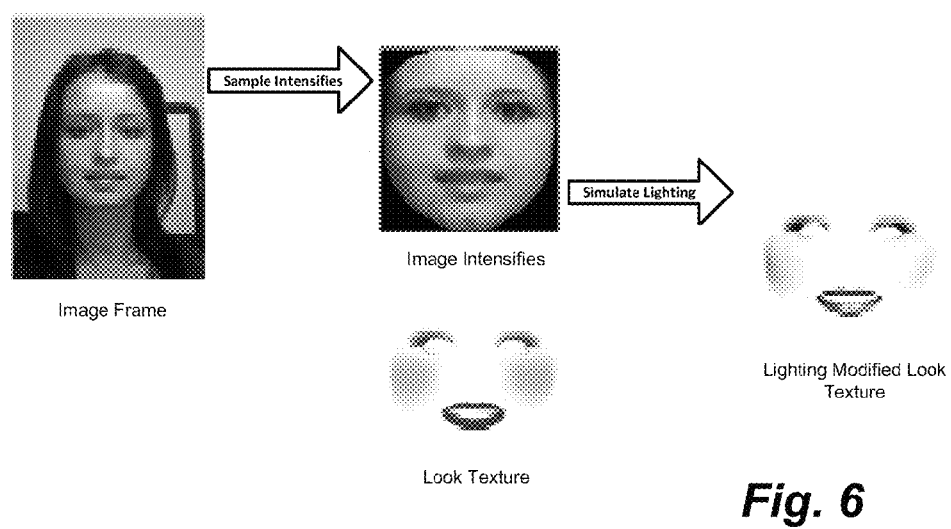
FIG. 6 shows an example of lighting simulation being applied to a Look Texture, in accordance with an embodiment of the present invention.

As now described with reference to FIG. 6, the Simulate Lighting 402 sub-method (shown in FIG. 4) of Simulate Look 211 applies pixel-wise intensity adjustment to the Look Texture such that the lighting levels in the resulting Look Texture match the corresponding lighting levels in the Image Frame. In one embodiment of the invention, the mapping between the Look Texture and the image is used to sample the Red, Green and Blue image intensities in the Image Frame corresponding to each pixel in the Look Texture. The sampled RGB values are converted to a single intensity value for each pixel. Using these measured image intensity values, each sample of the Look Texture is altered as follows:

if $I^i < \bar{I}$ $$dI = \frac{(I^i - \bar{I}) \max(RGB^d)}{\bar{I}},$$

else $$dI = \frac{(I^i - \bar{I}) \max(1 - RGB^d)}{(1 - \bar{I})},$$

$$RGB^t = RGB^d + wdI,$$

where
$RGB^t$ is the lighting modified Look Texture pixel consisting of a red green and blue value;
$RGB^d$ is the input Look Texture pixel consisting of a red green and blue value;
$I^i$ is the measured intensity from the Image Frame at the location corresponding to each Look Texture pixel;
$\bar{I}$ is the intensity of the $\overline{RGB}$ mean skin tone value computed in the Measure Calibration Parameters module; and
$w$ is a parameter which controls the overall strength of the lighting effect.

Finally, $RGB^t$ is truncated to lie in the range [0,1].

The effect of the foregoing lighting equations is to shift the RGB values of the Look Texture towards white or black as the lighting in the image varies from that measured in the calibration frame without changing the perceived color of each pixel of the Look Texture. Variations in lighting across the subject's face, such as illumination gradients and cast shadows, are accurately captured and a realistic final image is obtained with lighting that closely matches the image capture environment. FIG. 6 shows an example of lighting applied to a Look Texture. The Simulate Lighting method is designed to produce the desired effect whilst remaining amenable for calculation in real-time at high-resolution. The calculation can also be efficiently implemented on Graphical Processing Unit (GPU) devices as each pixel is independent from its neighbors.

Further realism of the virtual makeup may be achieved by altering the makeup appearance to simulate the effect of the capture environment's lighting being reflected by the product. This is achieved by modifying the Makeup Template's parameters that describe the reflective properties of the makeup to produce effects consistent with the texture of the product and the capture environment's lighting. A number of effects are possible using this approach, all of which are within the scope of this invention. For example, a glossy or shiny surface will reflect more of the light incident on the applied surface, in this case, a component can be added to the result of the above equations where its contribution is controlled by the parameter that specifies the shininess of the product. Another example is the need to create a glitter effect in products that contain small, highly reflective particles known as pearls. In this case, a number of pixels within the applied region are designated as being highly reflective. These pixels are chosen according to the size and density of the pearls within the product. A glitter effect is achieved by increasing the image intensities at the areas of high reflectance when they underlying surface is lit in the image. Furthermore, a twinkle effect is achieved when the light on the surface changes or by random selection of the highly reflective areas in each frame.

Render Look

The final step is undertaken by the Render Look module 403 that creates a Simulated Look Image by rendering the Look Texture on the Image Frame. The rendering process can be achieved using either 2D or 3D rendering utilising the Look Geometry mapping to warp the Look Texture precisely and accurately onto the subject's face in the Image Frame. One embodiment of the invention uses Look Geometry computed in 2D, and the rendering process involves overlaying the Look Texture on the face using the Look Texture's alpha channel and Alpha Combination, described above. Another embodiment of the invention is where the Look Geometry is computed in 3D, such that the rendering process involves the projection of the 3D geometry onto the image plane and rendering of the Look Texture respecting the alpha channel and other aspects of the 3D geometry including occlusion. Both methods of the foregoing rendering techniques are well-known in the art, and are encompassed, along with any other rendering method, within the scope of the present invention.

In an alternative embodiment, the Render Look module creates a before- and after-image of the face, simultaneously showing the users appearance with and without the desired makeup look. This could be achieved using a number of methods, all of which are within the scope of this invention. For example, before- and after-image frames may be concatenated side-by-side, or a desired makeup look may be rendered on only half of the user's face.

Figure 7:
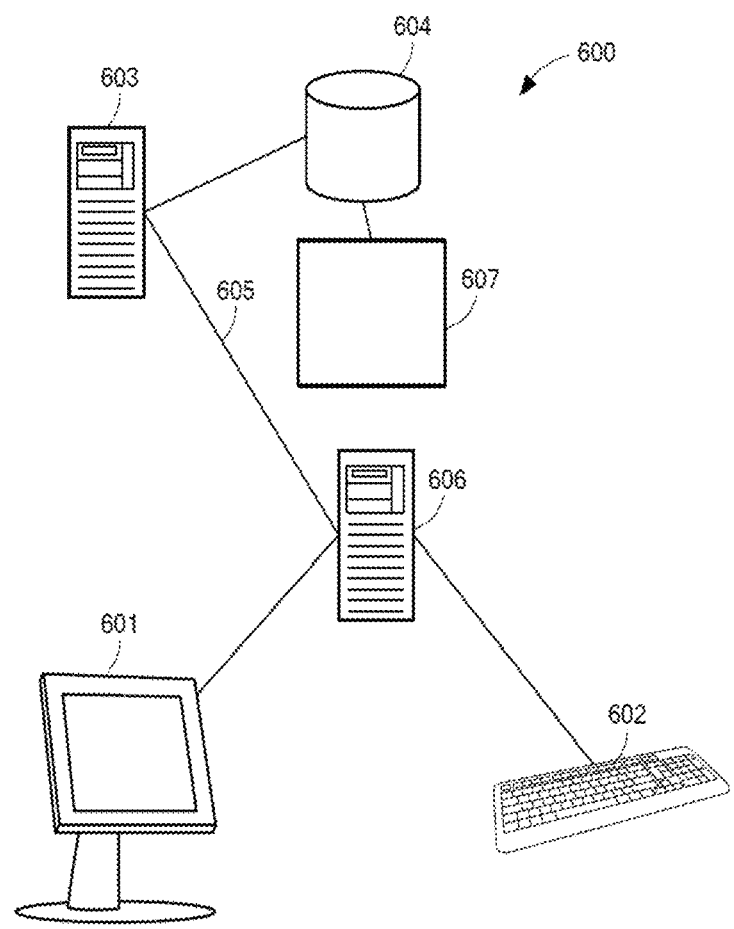
FIG. 7 schematically depicts one embodiment of a system that may be used to implement aspects of the present invention.

Various aspects of the invention may also be implemented as specialized software executing in a general-purpose computer system 600 such as that shown in FIG. 7. Alternatively, aspects of the present invention are advantageously implemented on mobile phones, tablets, and other devices. The computer system 600 may include a database server 603 connected to one or more memory devices 604, such as a disk drive, memory, or other device for storing data. Database server 603 stores an investor portfolio comprising a plurality of assets, or other data to which the present invention may be applied A processor 607 (also referred to herein as a central processing unit, or processing server) 605 contains computer-executable software configured to derive a threshold as taught in the foregoing description. Memory 604 is typically used for storing programs and data during operation of the computer system 600. Components of computer system 600 may be coupled by an interconnection mechanism 605, which may include one or more buses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism).

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 7. Various aspects of the invention may be practiced on one or more computers having a different architecture or components than that shown in FIG. 7.

Processors 607 and operating systems employed in conjunction with servers 603 and 605 define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate, or interpreted code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, while descriptions have been provided in terms of simulating makeup in video sequences, they are not limited to this context. The procedures are applicable to a wide variety of product simulation areas.

Moreover, where examples presented herein involve specific combinations of method acts or system elements, it should be understood that those acts and those elements may be combined in other ways to accomplish the same objective of automatic measurement of facial expression. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Additionally, single device features may fulfill the requirements of separately recited elements of a claim.

What is claimed is:

1. A computer-implemented method for real-time simulation of an application of at least one cosmetic product to a portion of a body of a user disposed in an image-capture environment, the image-capture environment subject to arbitrary lighting conditions, the method comprising:
   capturing a real-time image of the portion of the body of the user within the image-capture environment;
   deriving image-capture environment parameters and user visual characteristics from the real-time image of the portion of the body of the user;
   receiving a desired makeup look;
   extracting a correspondence between the desired makeup look and the portion of the body of the user in the real-time image;
   adapting the desired makeup look to simulate the image-capture environment parameters and the visual characteristics of the user by applying pixel-wise intensity adjustment relative to lighting values in the real-time image to obtain an adapted makeup look; and
   applying the adapted makeup look to an image of the portion of the body of the user based on the correspondence, thereby generating a composite image of the portion of the body with the desired makeup look, the composite image constituting a virtual makeup product characterized by an appearance.

2. A computer-implemented method in accordance with claim 1, wherein the portion of the body of the user includes a face of the user.

3. A computer-implemented method in accordance with claim 1, wherein the portion of the body of the user includes a hand of the user.

4. A computer-implemented method in accordance with claim 1, wherein the desired makeup look is specified in terms of a set of makeup templates including at least one makeup template.

5. A computer-implemented method in accordance with claim 1, wherein the makeup look includes information describing color and reflectance properties of at least one makeup product.

6. A computer-implemented method according to claim 5, wherein the information describing at least one of the color and reflectance properties of at least one makeup product is obtained from a measurement of a physical embodiment of the makeup product.

7. A computer-implemented method in accordance with claim 1, further comprising:
   modifying color and reflectance properties in at least one makeup template of the set of makeup templates.

8. A computer-implemented method in accordance with claim 1, wherein receiving a desired makeup look includes receiving data specified in terms of a catalog of cosmetics.

9. A computer-implemented method in accordance with claim 8, wherein the catalog of cosmetics is communicated to a personal computation device via at least one of a computer network, a wireless network, and an image scanner.

10. A computer-implemented method in accordance with claim 1, wherein the correspondence is defined on a basis of extracting a plurality of locations corresponding to an adaptive set of feature locations.

11. A computer-implemented method in accordance with claim 1, wherein the correspondence is defined on a basis of extracting a plurality of expression measurements.

12. A computer-implemented method in accordance with claim 1, wherein the makeup look is calibrated in a context of image-capture environment parameters in such a manner as to generate a makeup look matching the image-capture environment parameters.

13. A computer-implemented method according to claim 1, further comprising compensating colors of the adapted makeup look based on lighting in the image-capture environment.

14. A computer-implemented method in accordance with claim 1, wherein the adapted makeup look includes a plurality of independent layers corresponding to physical application of makeup.

15. A computer-implemented method in accordance with claim 14, further comprising modifying a color of at least one of the plurality of independent layers to simulate different colors of makeup using a single makeup template.

16. A computer-implemented method in accordance with claim 14, wherein at least one of the plurality of independent layers is color-corrected using a predetermined device color profile.

17. A computer-implemented method according to claim 1, wherein receiving the desired makeup look includes receiving a makeup template created by the user.

18. A computer-implemented method according to claim 1, further comprising displaying a before- and an after-image simultaneously showing the users appearance with and without the desired makeup look.

19. A computer-implemented method according to claim 1, wherein the steps of capturing, deriving, receiving, extracting, adapting and applying are implemented on a commercially available consumer device.

20. A method for designing a makeup cosmetic, the method comprising:
   capturing a real-time image of a portion of the body of a user within an image-capture environment;
   deriving image-capture environment parameters and user visual characteristics from the real-time image of the portion of the body of the user;
   receiving a specified makeup look;
   extracting a correspondence between the specified makeup look and the portion of the body of the user in the real-time image;
   adapting the desired makeup look to simulate the image-capture environment parameters and the visual characteristics of the user by applying pixel-wise intensity adjustment relative to lighting values in the real-time image to obtain an adapted makeup look;
   applying the adapted makeup look to an image of the portion of the body of the user based on the correspondence, thereby generating a composite image of the portion of the body with the desired makeup look, the composite image constituting a virtual makeup product characterized by an appearance; and
   modifying, in real time, parameters defining appearance of the virtual makeup product for designing a physical makeup cosmetic.

21. A method in accordance with claim 20, wherein the parameters defining appearance of the virtual makeup product comprise at least one of color, reflectance properties and physical ingredients.

* * * * *